Figure 1:
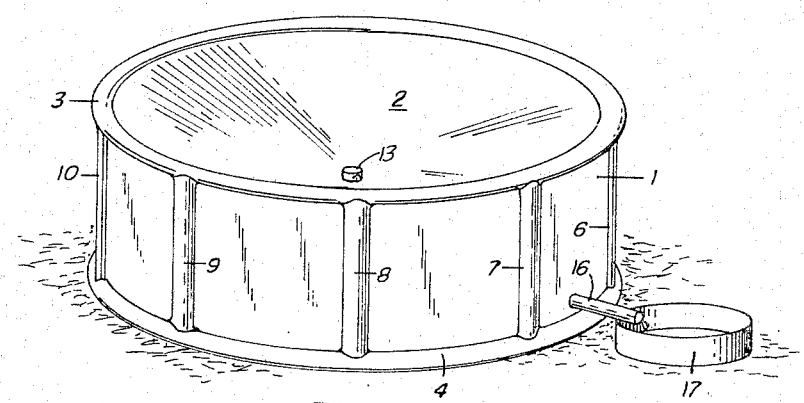

Aug. 22, 1967     D. S. HALACY, JR     3,337,418

PNEUMATIC SOLAR STILL

Filed Sept. 21, 1964

INVENTOR
DANIEL S. HALACY, JR.

United States Patent Office 3,337,418
Patented Aug. 22, 1967

3,337,418
PNEUMATIC SOLAR STILL
Daniel S. Halacy, Jr., 5804 W. Vista Ave., Glendale, Ariz. 85301
Filed Sept. 21, 1964, Ser. No. 397,725
3 Claims. (Cl. 202—83)

This invention relates to a solar still, and more especially to a still that, using the radiant heat of the sun will cause moisture in the surface on which the still is positioned to evaporate into a vapor in an enclosed space, while the surrounding atmosphere will keep the material bounding the enclosed space cool enough so that the vapor will condense on the material bounding the space from which it may be collected. Where the surrounding atmosphere is not sufficiently cool to cause condensation of the moisture during the day, which would be extremely rare, the coolness of night will cause condensation.

The devices of prior stills of this type include wooden or metal frames and, while they sometimes use a sheet plastic material to form a portion of the device, they are invariably bulky to carry or store and, if collapsible, are complicated to erect. The plastics used in the prior stills are varied; almost every plastic known having been mentioned in prior patents. The present invention is not dependent on the specific plastic chosen, although some plastic materials will be better suited than others as a material. For the condensing surface it is desirable to use a plastic material that is "wettable" so that when exposed to water vapor it will tend to induce film-like condensation of water on its surface, rather than to induce separate drops to form that may join other drops so that, instead of flowing along a sloping surface the merged drops fall prematurely from the surface of the plastic. Patents Nos. 2,427,262 and 2,813,063, for instance, suggest materials which will be suitable in the present invention. Materials not listed in the patents may, of course, also be used, the wettable materials being preferred. Also the term "transparent" has been used to describe the plastic material in the prior patents. The present invention does not depend on whether or not the plastic is transparent in the sense that objects within the device may be visible; it is desirable, however, that the ground, or the moist or wet surface from which the water is to be distilled, is heated to the greatest possible degree while the plastic material remains as cool as possible.

The device of the invention may be used on land, or at sea and is of especial use as emergency equipment to provide water to expeditions or individuals who find themselves without water in arid regions.

Assuming that an airplane makes a forced landing on a desert, and there is an insufficient supply of water in the plane, it is an object of the present invention to make water available. Also if the plane is downed at sea, or in an area of polluted water, it is an object of the present invention to provide pure water.

It is a further object of the present invention to provide a solar still made entirely of sheet plastic that may be folded into a very compact space.

A yet further object is to provide a device to collect rain water.

The device may also be effectively used when, as occurs during floods, there is all too much water about, but it is polluted. In such cases, polluted water may be poured on any area where the solar still of the present device may be conveniently erected.

Figure 2:
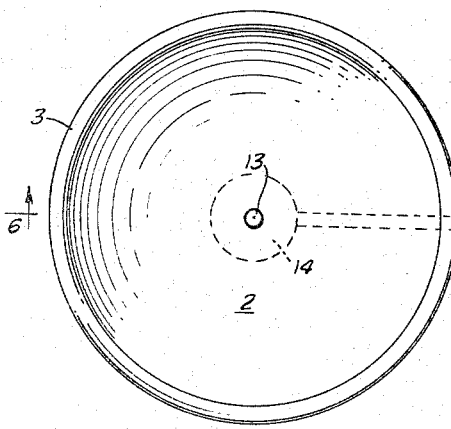
Figure 3:
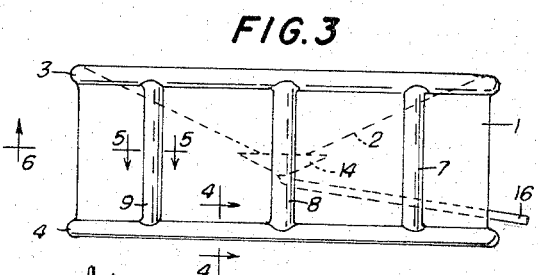
Figure 4:
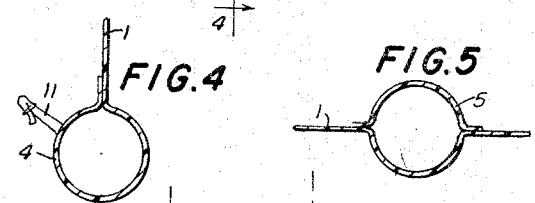
Figure 5:
Figure 6:
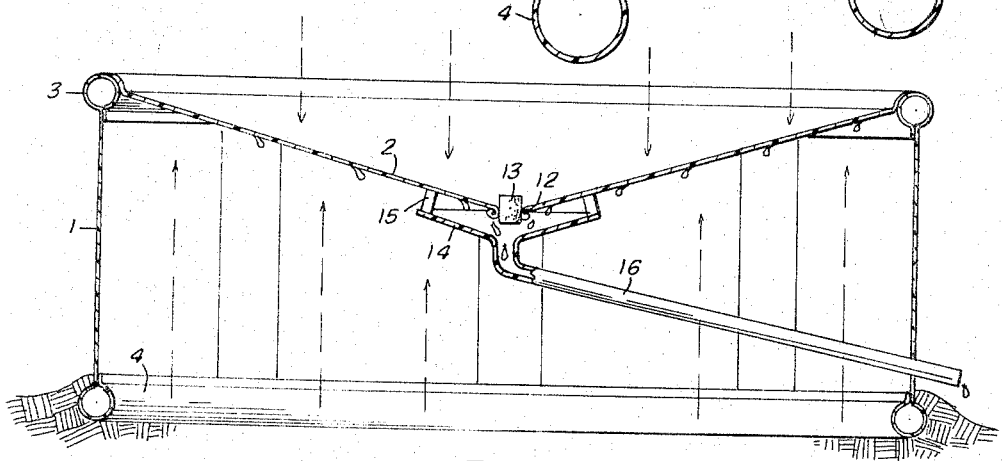

Other and further objects and advantages will appear from the following specification taken with the attached drawing in which like characters of reference refer to similar parts in the several views and in which:

FIGURE 1 is a perspective view of a preferred example of the device in use on land;
FIGURE 2 is a plan view;
FIGURE 3 is an elevation;
FIGURES 4 and 5 are fragmentary sections on lines 4—4 and 5—5 respectively of FIGURE 3;
FIGURE 6 is a median section through the device in use on land showing the operation thereof.

The device comprises an encircling and preferably generally cylindrical wall 1 and a generally conical funnel top 2 made entirely of thin sheet plastic material that is not self-supporting. The device can, therefore, be folded into a very light, compact bundle. The entire device may be made of bubble-thin polyethylene, or the like sheet plastic. The term "bubble-thin" as used here means a non-selfsustaining film that, like a bubble, will be supported by inflation of a part.

The top and bottom edges of the element 1 are hemmed over and sealed to form marginal tubular edges 3 at the top and 4 at the bottom that are airtight except as noted below. Equally spaced about the periphery of the cylindrical element, doubling pieces 5, as seen in FIGURE 5, are sealed to element 1 to provide tubular, vertical pockets 6, 7, 8, 9, 10, as required. At least three such pockets are usually required. The interior of the tubular edges and of the tubular vertical pockets are in pneumatic communication and are airtight except for their pneumatic connections to each other. An inflating tube 11 may be provided at any convenient point. FIGURE 4 shows such a tube connection to tubular edge 4. The edges 3 and 4, and the vertical pockets, when inflated, provide what may be termed pneumatic reinforcement for the side wall of the device. The bottom of the device is open, and the top is closed by the sheet of material 2 that is sealed to the top tubular edge 3 to form a moisture collecting funnel means. The point of the funnel may be provided with a grommet, or the like, 12 to receive a cork or stopper 13. With the cork 13 removed the device may be used to catch rain water. A tube similar to the inflating tube 11 may be provided in lieu of the grommet 12 and stopper 13.

A small drip catcher 14 is mounted just below the point of the funnel means 2 and is spaced a short distance below the moisture collecting funnel means. No specific design is suggested for the manner of supporting drip catcher 14. Supports 15, are merely an indication of some means or other to support element 14. From drip catcher 14 water that has condensed on the lower side of conical element 2, or that has run into the drip catcher 14 through grommet 12, is led by a flexible tubing 16 to a point on the outside of the vertical wall 1 of the device. The aperture through wall 1, through which tube 16 passes, should be substantially tight. If it is so desired tube 16 may be sealed to the wall 1, or tube 16 may be slidably adjustable in wall 1.

To use the device it is unfolded. The tube 11 is then used to inflate the tubular edges 3 and 4, and the vertical pockets, 6, 7, 8, etc. When this has been done the device is ready for use.

While the preferred exemplification is generally circular in plan, it is clear that a triangular, square, hexagonal or other plan would also be suitable.

The ground is cleared of a few inches of the surface material in an area large enough to accommodate the device. The device is placed on the newly cleared area and is preferably sealed down by heaping dirt about the outer side of tubular edge 4.

The sun on the device heats the interior of the device and the surface of the ground, which causes the moisture in the exposed earth to evaporate.

The cooling effect of air movements will, even in very hot areas, usually be sufficient to cool the material of the device sufficiently to cause the moisture in the hot interior of the device to condense on the underside of conical element 2. Even under the most adverse conditions, nightfall, bringing cooler temperatures, will cause the necessary condensation. The material of element 2 is such that the condensate will cling to it, merge on the surface, and run down the underside of funnel 2 where, flowing together to form large drops, it will drip into the drip catcher 14 and thence run through tube 16 into any suitable container. A closed container would, of course, be preferable to the open pan which is shown for purposes of illustration.

Other plastics than polyethylene may be used, the plastics that are most desirable are those which are "wettable" since use of wettable plastic reduces the slope of the plastic that is required to ensure that the condensate flows down the surface of the material rather than dripping off of the material before reaching the drip catcher 14.

Having thus described an exemplification of my invention, I claim:

1. A solar still comprising a continuous flexible band of thin flexible transparent material, an airtight tubular hem along each edge of said band, a plurality of airtight flexible tubular pockets pneumatically connected to and extending between said flexible tubular hems to form, with said hems, a pneumatic reinforcement so that, upon inflation, said band of material will form a side wall bounded at top and bottom by one of said hems, an inflation means pneumatically connected to said pneumatic reinforcement, a moisture collecting top element of thin flexible transparent sheet material sealed completely around the said hems at the top of said side wall to form a closed top for said still, said top elements being of generally funnel shape and extending downwardly to a lowest point whereby moisture collecting on the under surface of said top element will flow downwardly to the lowest point of said top element, a drip catcher positioned immediately below but spaced from said lowest point, and means to lead moisture dripping from said lowest point into said drip catcher to a point beyond the said continuous band of material, the lower hem presenting a completely open bottom.

2. A solar still comprising an upper and a lower endless tube of collapsible flexible plastic, a plurality of tubular connectors of flexible plastic, each pneumatically connected at its ends to said endless tubes, an inflating connection mounted on one of said endless tubes whereby said tubes and said tubular connectors can be inflated to form a selfsustaining frame generally cylindrical in plan, side panel elements closing the spaces between said endless tubes and said tubular connectors, a downwardly extending generally conical closure terminating at a low point within said frame, said closure being sealed at its periphery to the upper of said tubes, a drip catcher supported beneath and spaced slightly below said low point, and a tube means operatively connected to said drip catcher extending downwardly, and radially outwardly through one of said side panel elements, whereby moisture draining from said funnel like closure and drip catcher will be led to a point beyond the periphery of said self-supporting frame, said lower endless tube presenting a completely open bottom.

3. The solar still of claim 2 in which said closure at its lowest point is provided with a grommet, and a stopper removably engaging said grommet whereby rain falling on said closure may be permitted to flow through said closure.

References Cited

UNITED STATES PATENTS

| | | |
|---|---|---|
| 573,625 | 12/1896 | Ruffner. |
| 2,118,459 | 5/1938 | Chappell et al. _____ 73—171 |
| 2,412,466 | 12/1946 | Miller _____ 202—234 |
| 2,455,835 | 12/1948 | Ushakoff. |
| 3,034,154 | 5/1962 | Silverstone _____ 52—2 X |

FOREIGN PATENTS

| | | |
|---|---|---|
| 1,074,765 | 4/1954 | France. |
| 1,211,627 | 10/1959 | France. |
| 974,650 | 11/1964 | Great Britain. |
| 386,077 | 5/1963 | Japan. |

OTHER REFERENCES

Popular Science, October 1956, page 120.

NORMAN YUDKOFF, *Primary Examiner.*

D. EDWARDS, *Assistant Examiner.*